Figure 1:
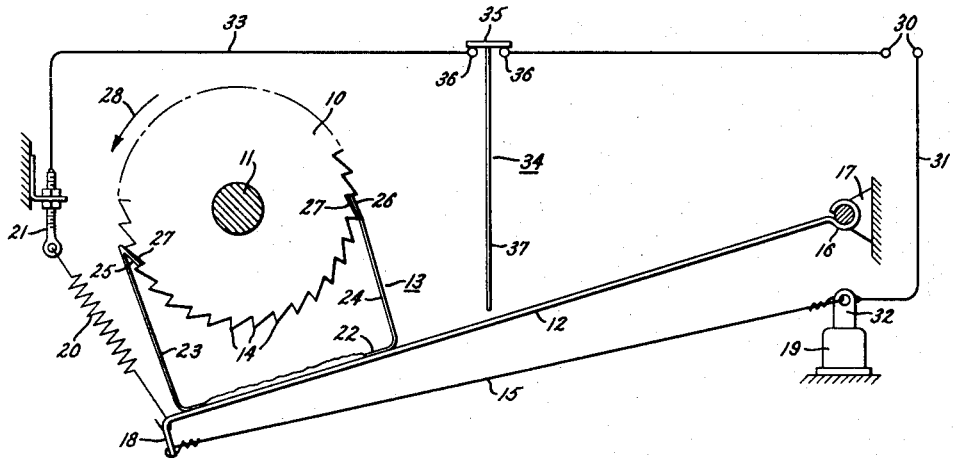

July 28, 1964 C. V. HAYS 3,142,149
DRIVE MECHANISM
Filed May 16, 1962

INVENTOR:
CARL V. HAYS,
BY David M. Schiller
ATTORNEY.

United States Patent Office 3,142,149
Patented July 28, 1964

3,142,149
DRIVE MECHANISM
Carl V. Hays, Melrose Park, Ill., assignor to General Electric Company, a corporation of New York
Filed May 16, 1962, Ser. No. 195,096
8 Claims. (Cl. 60—23)

This invention relates to drive mechanisms and has particular relation to thermal motors.

Thermal motors have heretofore been constructed which include a shaft which is rotated in response to expansion and contraction of a bimetallic member. A wide variety of designs of such motors have been proposed, but in the main the motors previously constructed have been comparatively expensive, slow in actuation and have included a large number of parts. In addition, thermal motors of previous design have been of the single acting type wherein the shaft is rotated but once for a complete cycle of expansion and contraction of a bimetallic member. Furthermore, previous thermal motors have provided relatively low torques rendering them unsuitable for many applications.

It is accordingly a primary object of the invention to provide a thermal motor of novel and improved construction which is relatively inexpensive, which is comparatively fast acting, and which includes a minimum number of parts.

It is another object of the invention to provide a high torque thermal motor of improved design which is of the double acting type wherein a shaft is rotated twice in a common direction for each complete cycle of expansion and contraction of a thermally-expansible device.

It is a further object of the invention to provide an improved thermal motor of comparatively high speed including a ratchet gear and a hot wire operatively associated with a unique double pawl to rotate the ratchet gear in response to each cycle of expansion and contraction of the hot wire twice in the same direction.

It is still another object of the invention to provide a novel and improved linear to rotary motion converter including a ratchet gear rotatable in response to linear movement of a unique double pawl.

In carrying out the invention in one preferred form a thermal motor is provided which includes a ratchet gear mounted for rotation about an axis in response to expansion and contraction of a thermally expansible wire. One end of the wire is connected to the free end of an elongated movably mounted arm and the other end of the wire is supported so as to normally maintain the arm away from the ratchet gear when the wire is cool and unexpanded. At the free end of the arm are mounted a pair of spaced resilient actuating elements having free ends extending into engagement with diametrically opposed gear teeth of the ratchet gear. The arm and actuating spring elements are moved toward the periphery of the ratchet gear in response to heating of the hot wire and expansion thereof, and are moved away from the periphery of the ratchet gear in response to cooling and contraction of the wire. The free ends of the actuating spring elements are of different configurations so that during movement of the arm toward the teeth, one spring element acts as a pawl to rotate the ratchet gear in one direction and the other spring element slips over the ratchet gear teeth. When the arm is moved away from the teeth, the other element acts as a pawl to rotate the ratchet gear in the same direction as before and the one element then slips over the ratchet gear teeth.

In order to alternately heat and cool the expansible wire electric current is periodically passed therethrough, and to this end an electric circuit is provided including the expansible wire. The circuit is periodically interrupted in any suitable manner to provide the back and forth movement of the arm and consequent rotation of the ratchet gear.

Figure 2:
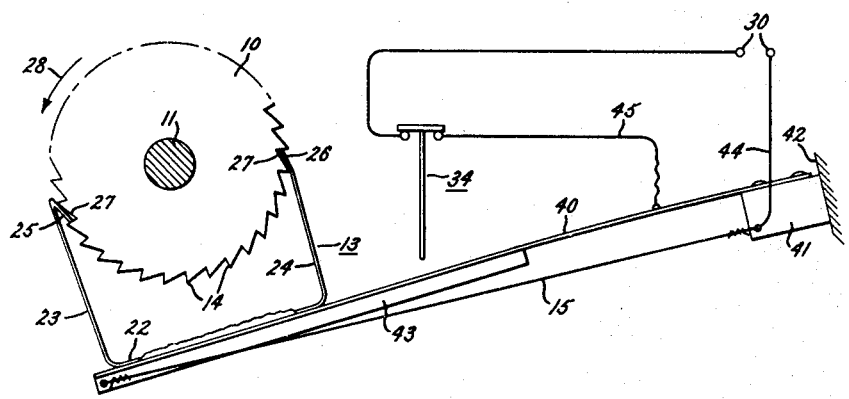

Other objects and advantages of the invention will become apparent from the following description taken in conjunction with the accompanying drawing in which:

FIG. 1 is a schematic representation of a thermal motor constructed in accordance with the present invention, and FIG. 2 is a view similar to FIG. 1 showing a different embodiment of the invention.

Referring now to the drawing there is illustrated in FIG. 1 a thermal motor embodying the teachings of the present invention and including a ratchet gear 10 mounted on a rotatably supported shaft 11 for rotation about the axis of the shaft. In the embodiment of FIG. 1 rotation of the ratchet gear 10 is effected in response to movement of an arm 12 through the agency of a unique double pawl device 13 which is carried by the arm 12 and which engages teeth 14 about the periphery of the ratchet gear 10.

The arm 12 is preferably formed of an electroconductive material such as brass, Phosphor bronze or aluminum, and is moved relative to the device 13 by means of a thermally expansible device shown in the form of a hot wire 15 operatively connected to the arm 12. The wire 15 may be formed of any suitable material so that the wire expands and contracts longitudinally in response to heating and cooling thereof. The wire 15 should be formed of a conductive material having a high thermal coefficient of expansion, a high yield of creep stress, and a high modulus of elasticity. Also, for high voltage applications, such as 110 volts, the wire should be formed of material having a high resistivity, such as alloys of nickel and chromium.

In the embodiment of FIG. 1 the arm 12 is pivotally mounted at its one end 16 by an insulating support 17 so that the arm 12 extends generally perpendicular to the axis of shaft 11 with the free end 18 of the arm 12 located adjacent and beneath the ratchet gear teeth 14 as viewed in FIG. 1. The expansible wire 15 is connected at one end to the free end 18 of the arm 12 and at its other end is anchored to a conductive terminal part of an insulating support 19. In order to effect movement of arm 12 and device 13 upwardly toward gear 10 during heating and expansion of wire 15, a tension spring 20 is connected between free end 18 of arm 12 and an adjustably mounted terminal screw 21. With the described arrangement, the arm 12 will assume the position shown in FIG. 1 against the pull of spring 20 when the wire 15 is unheated and is contracted. When the wire 15 is heated and expanded, it is appreciated that the arm 12 is pivoted upwardly as viewed in FIG. 1 by action of the spring 20 toward the adjacent teeth 14 of the ratchet gear 10. When the wire is subsequently cooled and contracts, the arm 12 is pivoted downwardly back to its illustrated position.

The above-described movements of the arm 12 are transformed into rotary movement of the ratchet gear 10 by means of the double pawl device 13 shown in the form of a generally U-shaped member having a flat base 22 and a pair of upstanding generally parallel resilient arms or actuating elements 23 and 24. The base 22 of the device 13 is attached to the free end 18 of the arm 12 in any suitable manner, such as by welding, so that the free ends 25 and 26 of the elements 23 and 24 respectively extend into biased engagement with substantially diametrically opposed ones of the teeth 14. The free end 25 of the element 23 may be termed an acute end and is bent at an acute angle with respect to the main length of the element 23. The free end 26 of the element 24 may be referred to as an obtuse end inasmuch as it is bent out of the plane of the main length of the element 24 to form an obtuse angle therewith.

In order to maintain substantially constant the force applied by elements 23 and 24 on the ratchet gear 10 and to prevent the elements from slipping over too many teeth 14, the free ends 25 and 26 of the elements are configured so that they are slightly displaced from parallel relationships with the surfaces 27 of the teeth 14 engaged by the free ends 25 and 26 as shown in FIG. 1. The tension of spring 20 is adjusted by screw 21 so that a line connecting the free ends 25 and 26 of the elements 23 and 24 passes through the center of shaft 11 when the device 13 is substantially at the midpoint of its stroke. Tension of the spring 20 should never be greater than the yield strength of the wire 15.

When the arm 12 is pivoted toward the teeth 14 by spring 20 in response to heating and expansion of wire 15, the elements 23 and 24 are moved therewith and the element 24 serves as a pawl for this condition to rotate the ratchet gear 10 counterclockwise as viewed in the drawing in the direction of the arrow 28. At this time the free end 25 of element 23 slips over the rotating teeth due to the resiliency of element 23, and when the arm 12 has been pivoted upwardly to its extreme limit, rotation of ratchet 10 is terminated. When this occurs, the free end 25 of element 23 engages a tooth to prevent back rotation of the ratchet gear 10 in a clockwise direction.

When the wire 15 is cooled and contracts, the arm 12 and the device 13 are moved downwardly away from the teeth 14 toward the position shown, and during such movement of arm 12, the element 23 serves as a pawl to effect rotation of ratchet gear 10 in the direction of the arrow 28 while at the same time the free end 26 of element 24 slips over the rotating teeth due to the resiliency of element 24. When the arm 12 and the device 13 have moved to the position shown, rotation of ratchet gear 10 is terminated and the free end 26 of element 24 prevents rotation of ratchet gear 10 in the reverse clockwise direction. It is thus seen that a double-acting thermal motor is provided wherein the ratchet gear 10 is rotated twice in the same direction for each complete cycle of expansion and contraction of the wire 15.

The alternate expansion and contraction of wire 15 may be effected in any suitable manner. In the embodiment shown, the wire 15 is heated and cooled by periodically passing electric current therethrough. For this purpose the wire 15 is included in an electric circuit which may be traced from one of the terminals 30, which represent a source of either direct or alternating voltage, a conductor 31, a terminal 32, the wire 15, part of the arm 12, the spring 20, screw 21, and a conductor 33 connected to the screw 21 and extending back to the other of the terminals 30. A switch 34 is included in this circuit and is preiodically operated to effect periodic establishment and interruption of the circuit. Periodic operation of switch 34 may be effected in any suitable manner, such, for example, as by a timing device.

If desired the thermal motor may provide its own cycle control, and this is accomplished by having the arm 12 effect actuation of the switch 34. In the illustrated embodiment, the switch 34 includes a movable contact 35 normally engaging spaced fixed contacts 36 in the heating circuit whereby switch 34 is in a normally closed condition to establish the heating circuit. When arm 12 has pivoted upwardly a certain amount in response to the passage of current through the wire 15, the arm 12, or other mechanism controlled thereby, engages the switch operator 37 to elevate contact 35 and disengage contacts 35 and 36 to interrupt the circuit and initiate cooling of wire 15. It can be appreciated that after the heating circuit is interrupted, arm 12 will continue to move upwardly to a predetermined upper limit at which the wire 15 ceases to expand.

When arm 12 has been pivoted downwardly to a certain position above its extreme lower limit shown in response to cooling of wire 15, contact 35 reengages lower contacts 36 to reestablish the heating circuit and cause heating of wire 15. After such reestablishment of the heating circuit, the arm 12 will continue to move downwardly to a predetermined lower limit shown at which the wire 15 ceases to contract. If the time lag which causes continued movement of arm 12 after energization and deenergization of the heating circuit is insufficient to permit movement of arm 12 to the desired limits, a suitable time delay may be incorporated in the operation of switch 34 so that operation of switch 34 is delayed until arm 12 is very close to the desired limits.

A further embodiment of the invention is illustrated in FIG. 2 and includes parts similar to parts employed in the device of FIG. 1. The parts of the devices of FIGS. 1 and 2 which are similar are represented by the same reference numerals.

In the FIG. 2 device an arm 40 is utilized which is of different construction and arrangement than the corresponding arm 12 of the device of FIG. 1, and which allows the spring 20 in the device of FIG. 1 to be omitted. In FIG. 2 the arm 40 is rigidly secured at its right hand end to an insulator 41 attached to a support 42 and extends beneath the ratchet gear 10. The arm 40 is formed of an electro-conductive material, such as brass, Phosphor bronze or aluminum, to be deflectable about a selected pivot point towards and away from the ratchet gear 10 in response to heating and cooling of a hot wire 15 attached to the insulator 41 and to the free end of arm 40.

The outer section of the arm 40 which carries the device 13 is constructed to be rigid against deflection, and for this purpose is provided with a depending stiffening flange 43 which preferably extends along approximately two-thirds of the length of the arm 40. With the described arrangement, the inner one-third of the arm 40 will provide the desired spring action to move the device 13 along the desired path.

When the wire 15 is unheated and contracted, the arm 40 is deflected downwardly and is under compression as shown in FIG. 2. The wire 15 is heated and cooled by periodically passing electric current therethrough in a manner essentially the same as that employed in the device of FIG. 1. The heating circuit for wire 15 may be traced from one of the terminals 30, through a wire 44, the wire 15, a portion of the arm 40, and a flexible wire 45 back to the other of the terminals 30. As in FIG. 1 the switch 34 may be included in the heating circuit to be operated in response to movement of the arm 40.

When the wire 15 is heated and expands, the compression of arm 40 is relieved and the arm 40 deflects upwardly to move the device 13 upwardly which causes rotation of the ratchet gear 10 in the direction of arrow 28. After the switch 34 is operated to interrupt the heating circuit, the wire 15 cools and contracts to deflect the arm 40 and move the device 13 downwardly which rotates gear 10 in the direction of arrow 28. Such deflection of arm 40 downwardly causes operation of switch 34 to reestablish the heating circuit.

The advantages of the improved thermal motor above-described are numerous. Such motor is of very low cost design and incorporates a minimum number of parts. It is of rugged construction, high speed and provides a high torque. Furthermore, the motor is double acting, providing two rotary movements of shaft 11 in a common direction in response to a complete heating and cooling cycle of the wire 15. A motor constructed according to the teachings of the invention has rotated at speeds within the range of five revolutions per minute to five revolutions per hour depending on the heat transfer from the wire 15, and the speed of rotation of the motor may be varied by changing the rate of interruption of establishment of the heating circuit.

While the invention has been described in connection with a thermal motor, it can be appreciated that the device 13 can be moved by means other than expansion and contraction of a hot wire 15. As an example, a reciprocable solenoid can be operatively connected to the device 13 for effecting linear back and forth movements thereof which are converted to a unidirectional rotary motion of the gear 10. Other means of effecting movement of the device 13 will suggest themselves to those skilled in the art. The motor described has a variety of applications among which may be listed a drive for a stepping switch, a slow speed counter, a time-delay relay, a rotary solenoid, a latching relay, and a cycle control for appliances.

By forming the arms 12 and 40 of material such as brass or aluminum, ambient temperature compensation is provided in that the arm will expand and contract along with the wire 15 in response to variations in ambient temperature. The described hot wire motor is capable of handling greater loads than heretofore possible since maximum tension of the wire 15 is attained when the wire is cooled and contracted, and the wire has higher allowable stress when cooled. This design maximizes the strength of the wire.

While I have shown certain embodiments of my invention, it should be understood that these examples have been clearly illustrative in nature. Since certain variations in the invention will doubtless occur to those skilled in the art to which the invention pertains, I intend to cover by the appended claims all such variations as fall within the true spirit and scope of this invention.

What I claim as new and desire to secure by Letters Patents of the United States is:

1. A drive mechanism comprising a rotatably mounted ratchet, an elongated arm, support means rigidly mounting said arm at one end so that the arm extends generally perpendicular to the axis of rotation of said ratchet for movement towards and away from said ratchet, a pair of generally parallel elements on the arm adjacent the free end thereof and spaced longitudinally of the arm, said elements having free ends engaging substantially diametrically opposed teeth of the ratchet, the free ends of said elements forming respectively obtuse and acute angles with the main lengths thereof so that the obtuse element rotates the ratchet in one direction as the arm is moved toward the ratchet, and the acute element rotates the ratchet in said one direction as the arm is moved away from the ratchet, a thermally expansible wire connected to the free end of said arm and to said support means to deflect said arm away from said ratchet when cool and unexpanded, and means for periodically passing electric current through said wire.

2. A drive mechanism comprising a rotatably mounted ratchet, an elongated arm, support means mounting said arm at one end so that the arm extends generally perpendicular to the axis of rotation of said ratchet, a U-shaped member on said arm at the free end thereof and having resilient legs with free ends of the legs engaging substantially diametrically opposed teeth of the ratchet, the free ends of said legs forming respectively obtuse and acute angles with the main lengths thereof so that the obtuse end rotates the ratchet in one direction as the arm is moved toward the ratchet, and the acute end rotates the ratchet in said one direction as the arm is moved away from the ratchet, and means for alternately moving said arm towards and away from said ratchet including a thermally expansible wire connected to the free end of said arm to move said arm towards and away from the ratchet in response to alternate heating and cooling of the wire respectively, and means for alternately heating and cooling said wire.

3. A drive mechanism comprising a rotatably mounted ratchet, an arm mounted at one end for movement towards and away from said ratchet in directions generally perpendicular to the axis of rotation of said ratchet, a pair of spaced generally parallel resilient elements on said arm having free ends engaging substantially diametrically opposed teeth of said ratchet, the free ends of said elements forming respectively obtuse and acute angles with the main lengths thereof so that the obtuse element rotates the ratchet in one direction as the arm is moved toward the ratchet, and the acute element rotates the ratchet in said one direction as the arm is moved away from the ratchet, a thermally expansible wire connected to the free end of said arm to move said arm towards and away from the ratchet in response to alternate heating and cooling of the wire respectively, and means for alternately heating and cooling said wire comprising an electric circuit including said wire, and a switch included in said circuit in series with said wire, said switch being periodically opened and closed to respectively interrupt and establish the circuit in response to movement of said arm.

4. A drive mechanism comprising a rotatably mounted ratchet, an elongated arm, support means rigidly mounting said arm at one end so that the arm extends generally perpendicular to the axis of rotation of said ratchet for movement towards and away from said ratchet, a pair of resilient elements on the arm adjacent the free end thereof and spaced longitudinally of the arm, said elements having free ends engaging substantially diametrically opposed teeth of the ratchet, the free ends of said elements forming respectively obtuse and acute angles with the main lengths thereof so that the obtuse element rotates the ratchet in one direction as the arm is moved toward the ratchet, and the acute element rotates the ratchet in said one direction as the arm is moved away from the ratchet, a thermally expansible wire connected to the free end of said arm and to said support means to deflect said arm away from said ratchet when cool and unexpanded and to release said arm for movement toward said ratchet when heated and expanded, and means for periodically passing electric current through said wire comprising an electric circuit including said wire, and a switch included in said circuit in series with said wire and having an operating element, said arm engaging said operating element when the wire is expanded to open said switch and interrupt the circuit, and disengaging said operating element when the wire is contracted to close said switch and establish said circuit.

5. A drive mechanism comprising a rotatably mounted ratchet, an arm mounted at one end for pivotal movement about an axis generally parallel to the axis of rotation of the ratchet towards and away from the ratchet, resilient means connected to said arm to bias the arm towards said ratchet, a pair of spaced generally parallel resilient elements fixed to said arm having free ends engaging substantially diametrically opposed teeth of said ratchet, the free ends of said elements forming respectively obtuse and acute angles with the main lengths thereof so that the obtuse element rotates the ratchet in one direction as the arm is pivoted toward the ratchet, and the acute element rotates the ratchet in said one direction as the arm is pivoted away from the ratchet, a thermally expansible wire connected to the free end of said arm to pivot the arm towards and away from the ratchet in response to alternate heating and cooling of the wire respectively, said wire when cool and contracted holding said arm away from said ratchet against the bias of said resilient means, said wire when heated and expanded releasing said arm for pivotal movement toward said ratchet under action of said resilient means, and means for alternately heating and cooling said wire.

6. A drive mechanism comprising a rotatably mounted ratchet, an arm rigidly supported at one end for deflection towards and away from said ratchet, a pair of spaced generally parallel resilient elements fixed to said arm adjacent the free end thereof, said elements having free ends engaging substantially diametrically opposed teeth of said ratchet, the free ends of said elements forming respectively obtuse and acute angles with the main lengths thereof so that the obtuse element rotates the ratchet in one direction as the arm is deflected toward the ratchet, and the acute element rotates the ratchet in said one direction as the arm is deflected away from the ratchet, a thermally expansible wire connected to the free end of said arm to deflect the arm towards and away from the ratchet in response to alternate heating and cooling of the wire, said wire when cool and contracted holding said arm in compression and deflected away from said ratchet, said wire when heated and expanded releasing said arm for deflection toward said ratchet, means for alternately heating and cooling said wire, and a stiffening member on said arm extending from the free end thereof toward the supported end thereof over a substantial length thereof.

7. A drive mechanism comprising a rotatably mounted ratchet, an arm mounted at one end for pivotal movement about an axis generally parallel to the axis of rotation of the ratchet towards and away from the ratchet, resilient means connected to said arm to bias the arm towards said ratchet, a U-shaped member fixed to said arm at the free end thereof and on the side of the arm adjacent said ratchet, said U-shaped member having resilient generally parallel legs with free ends engaging substantially diametrically opposed teeth of the ratchet, the free ends of said legs forming respectively obtuse and acute angles with the main lengths thereof so that the obtuse end rotates the ratchet in one direction as the arm is moved toward the ratchet, and the acute end rotates the ratchet in said one direction as the arm is moved away from the ratchet, a thermally expansible wire connected to the free end of said arm at the other side of said arm to pivot the arm towards and away from the ratchet in response to alternate heating and cooling of the wire respectively, said wire when cool and contracted holding said arm away from said ratchet against the bias of said resilient means, said wire when heated and expanded releasing said arm for pivotal movement towards said ratchet under action of said resilient means, and means for alternately heating and cooling said wire comprising an electric circuit including said wire, and a switch included in said circuit in series with said wire, said switch being periodically opened and closed to respectively interrupt and establish the circuit in response to movement of said arm.

8. A drive mechanism comprising a rotatably mounted ratchet, an arm rigidly mounted at one end for deflection towards and away from the ratchet, a U-shaped member fixed to said arm at the free end thereof and on the side of the arm adjacent said ratchet, said U-shaped member having resilient generally parallel legs with free ends engaging substantially diametrically opposed teeth of the ratchet, the free ends of said legs forming respectively obtuse and acute angles with the main lengths thereof so that the obtuse end rotates the ratchet in one direction as the arm is moved toward the ratchet, and the acute end rotates the ratchet in said one direction as the arm is moved away from the ratchet, a thermally expansible wire connected to the free end of said arm at the other side of said arm to deflect the arm towards and away from the ratchet in response to alternate heating and cooling of the wire respectively, said wire when cool and contracted deflecting said arm away from said ratchet, said wire when heated and expanded releasing said arm for deflection towards said ratchet, means for alternately heating and cooling said wire comprising an electric circuit including said wire, and a switch included in said circuit in series with said wire, said switch being periodically opened and closed to respectively interrupt and establish the circuit in response to movement of said arm, and a stiffening member on said arm extending from the free end thereof toward the supported end thereof over a substanial length thereof.

References Cited in the file of this patent

UNITED STATES PATENTS

| | | |
|---|---|---|
| 1,743,478 | Pratt | Jan. 14, 1930 |
| 1,881,884 | Noble | Oct. 11, 1932 |
| 2,203,719 | Crane | June 11, 1940 |

FOREIGN PATENTS

| | | |
|---|---|---|
| 360,334 | Germany | Oct. 2, 1922 |
| 382,494 | Germany | Oct. 3, 1923 |
| 624,299 | France | Apr. 2, 1927 |
| 637,763 | Great Britain | May 24, 1950 |